United States Patent
Fontana

(10) Patent No.: US 8,714,966 B2
(45) Date of Patent: May 6, 2014

(54) APPARATUS FOR THE INJECTION MOULDING OF CONTAINERS IN PLASTIC MATERIAL

(75) Inventor: Antonio Fontana, Carpi (IT)

(73) Assignee: Lameplast S.p.A., Frazione Rovereto sul Sechia (IT)

( * ) Notice: Subject to any disclaimer, the term of this patent is extended or adjusted under 35 U.S.C. 154(b) by 65 days.

(21) Appl. No.: 13/516,948

(22) PCT Filed: Sep. 10, 2010

(86) PCT No.: PCT/IB2010/002248
§ 371 (c)(1),
(2), (4) Date: Jun. 18, 2012

(87) PCT Pub. No.: WO2011/077199
PCT Pub. Date: Jun. 30, 2011

(65) Prior Publication Data
US 2012/0251649 A1 Oct. 4, 2012

(30) Foreign Application Priority Data
Dec. 21, 2009 (IT) .............................. MO2009A0303

(51) Int. Cl.
*B29C 45/36* (2006.01)
(52) U.S. Cl.
USPC ........................................................ 425/577
(58) Field of Classification Search
USPC .......................................................... 425/577
See application file for complete search history.

(56) References Cited

U.S. PATENT DOCUMENTS

| 4,515,342 A * | 5/1985 | Boskovic ...................... 425/577 |
| 2001/0015512 A1 * | 8/2001 | Fontana ....................... 425/552 |
| 2007/0154589 A1 * | 7/2007 | Fields ........................... 425/577 |
| 2009/0020915 A1 * | 1/2009 | Mai et al. ...................... 425/577 |

OTHER PUBLICATIONS

International Search Report filed in PCT/IB2010/002248.

* cited by examiner

*Primary Examiner* — Tim Heitbrink
(74) *Attorney, Agent, or Firm* — Stein IP, LLC

(57) ABSTRACT

The apparatus (1) for the injection molding of containers in plastic material comprises a mold (2) having a female matrix die (3) and a corresponding male element (4) that can be coupled to one another, between the female matrix die (3) and the male element (4) being defined a forming inter-space (5) of at least a container, and at least a centering stem (10) for centering the male element (4) with respect to the female matrix die (3), which comprises a first extremity (12) having a locator surface (12a) for the male element (4), is sliding along a sliding direction (D) substantially transversal with respect to the male element (4) inside a corresponding centering hole (11) obtained in the female matrix die (3), and is mobile with reciprocating motion between a backward configuration, in which the locator surface (12a) is substantially arranged in correspondence to the inner surface of the female matrix die (3), and a forward configuration, in which the locator surface (12a) is up fast on the male element (4), the first extremity (12) of the centering stem (10) having a cross section substantially decreasing towards the locator surface (12a).

14 Claims, 3 Drawing Sheets

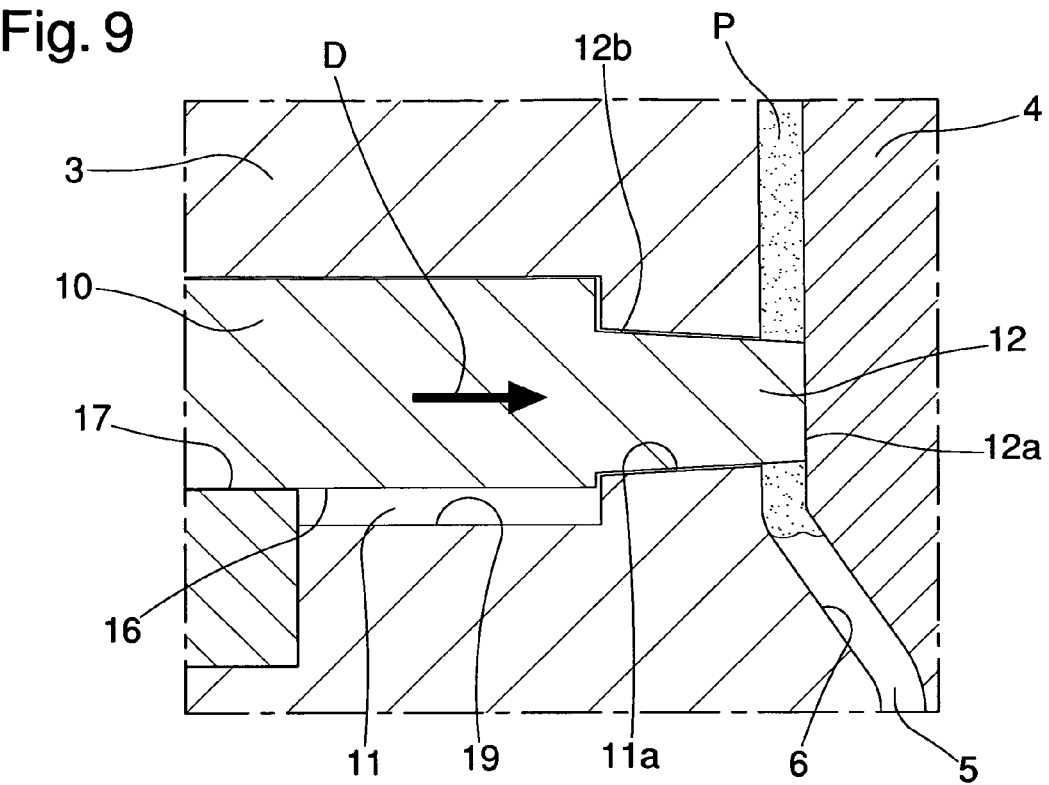
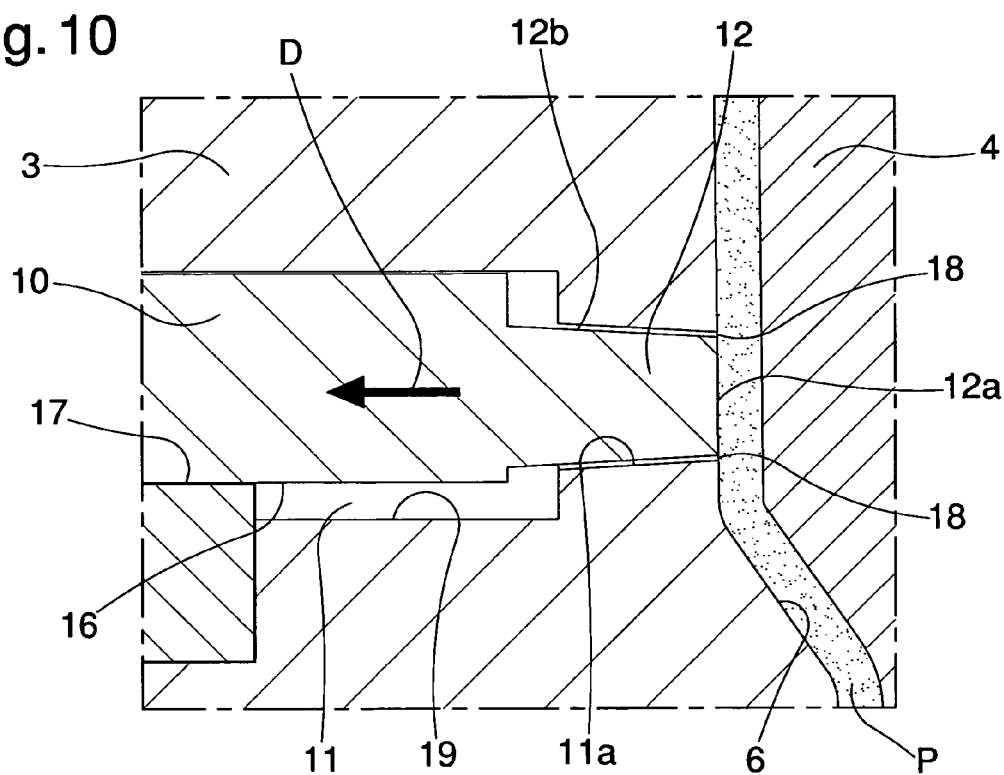

APPARATUS FOR THE INJECTION MOULDING OF CONTAINERS IN PLASTIC MATERIAL

CROSS-REFERENCE TO RELATED APPLICATIONS

This application claims the benefit of PCT International Patent Application No. PCT/IB2010/002248, filed Sep. 10, 2010, and Italian Patent Application No. MO2009A000303, filed Dec. 21, 2009, the disclosures of which are incorporated herein by reference.

BACKGROUND OF THE INVENTION

1. Field of the Invention

The present invention relates to an apparatus for the injection moulding of containers in plastic material, such as, e.g., single-dose bottles for pharmaceutical, medicinal and cosmetic products.

2. Description of the Related Art

Moulds are known for moulding containers composed essentially of a female matrix die wherein are obtained one or more cavities inside which can be inserted corresponding male elements, the cavities being in the same number as the containers moulded at each cycle.

Between the inner surface of the above cavities and the outer surface of the relevant male elements an inter-space is defined wherein is injected under pressure a plastic material to be moulded, of the thermoplastic, thermosetting type, etc.

The shape or the thickness of the inter-space defines both the shape and the thickness of the walls of the containers to be made.

In this respect, it must be noted that the thickness of the walls of the containers of the type of the single-dose bottles for pharmaceutical or cosmetic products is very thin, e.g., around 0.6÷0.8 mm, and requires very narrow tolerance intervals.

On the one hand in fact, the container must have characteristics of deformability and flexibility such as to allow the user to extract all the product contained inside, while on the other it must ensure the storage of the product in integral and unaltered conditions.

The moulds of known type are not without their drawbacks, including the fact that they do not guarantee the centring between the male element and the female matrix die.

The male element in fact, takes on misaligned and inflexed configurations with respect to the matrix die and this causes a change in the thickness of the inter-space defined between them and therefore in the thickness of the walls of the moulded container which, not only can take on values outside the acceptable tolerance interval, but can be interrupted by hollows and/or cavities.

Consequently, there is an increase in production rejects and, considering the retrieval of the rejected material is often difficult and costly, this results in obvious wastes of materials and energy, time extensions and increase in production costs.

To overcome these drawbacks, the document US 2001/0015512 describes the use of a particular injection-moulding apparatus having specific automatic centring means of the male elements in the corresponding matrix die.

Such centring means are composed of a pair of stems arranged inside corresponding holes obtained in the matrix die on opposite sides of each male element.

Inside the holes, the stems are moving closer to and away from the male elements between a backward configuration and a forward configuration.

In the backward configuration, in point of fact, the stems are positioned flush with the matrix die cavities and complete its profile, while in the forward configuration they are stopped up against the male elements, centring them and fixing them with respect to the matrix die and interrupting the continuity of the inter-space.

During moulding, the plastic material is injected into the mould until the inter-space is nearly totally filled (e.g., 90%) and, as long as this remains in fluid state, the stems are taken to the backward configuration restoring the continuity of the profile of the inner cavities of the mould.

In this configuration, the injection of the residual fraction of plastic material allows completing the moulding of the container walls.

This particular moulding apparatus is not without its drawbacks however including the fact that the alternate sliding of the stems in the corresponding holes of the matrix die soon determines the arising of serious problems tied to material wear.

The coupling between stems and holes, in fact, is achieved by adopting very narrow tolerances and the sliding is such as to cause fast surface wear, with the formation of small metal scraps which often end up inside the inter-space during moulding.

The containers thus formed therefore have inconvenient metal inclusions inside the walls which are visible from the outside, above all if the plastic material is white or transparent.

These containers inevitably end up by being rejected because not in compliance with the required project specifications from a technical and/or aesthetic and/or hygienic viewpoint.

In this respect, it must be underlined that in the medical, pharmaceutical and/or cosmetic field, the use of containers in imperfect aesthetic conditions produces in users the doubt that the fluid products contained in them have been contaminated and, consequently, their refusal to use them.

The apparatus according to the document US 2001/0015512, is also therefore susceptible to further upgrading aimed at reducing the rejects and production times, limiting material and energy waste, and cutting manufacturing costs, with the possibility of lowering the retail prices and making the products more interesting for consumers.

SUMMARY OF THE INVENTION

The main aim of the present invention is to eliminate the drawbacks complained of above affecting the moulds of known type and to provide an apparatus for the injection moulding of containers in plastic material which allows reducing the thickness of the inter-space defined between male and female within the required tolerance interval, to successfully centre the male elements with respect to the corresponding female matrix die, to maintain the males in aligned configuration during container moulding and, at the same time, considerably reduce the number of rejects, waste and manufacturing costs, thereby becoming more competitive from an economic viewpoint.

Another object of the present invention is to provide an apparatus for the injection moulding of containers in plastic material which allows overcoming the mentioned drawbacks of the state of the art within the ambit of a simple, rational, easy and effective to use as well as low cost solution.

The above objects are all achieved by the present apparatus for the injection moulding of containers in plastic material, comprising at least a mould having at least a female matrix die and at least a corresponding male element that can be coupled to one another, between said female matrix die and said male element being defined a forming inter-space of at least a container, and at least a centring stem for centring said male element with respect to said female matrix die, which comprises a first extremity having at least a locator surface for said male element, is sliding along a sliding direction substantially transversal with respect to said male element inside a corresponding centring hole obtained in said female matrix die, and is mobile with reciprocating motion between a backward configuration, in which said locator surface is substantially arranged in correspondence to the inner surface of said female matrix die, and a forward configuration, in which said locator surface is up fast on said male element, characterised by the fact that said first extremity of the centring stem has a cross section substantially decreasing towards said locator surface.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 9 is a section view of a detail of the apparatus according to the invention in a forward configuration;

FIG. 10 is a section view of a detail of the apparatus according to the invention in a backward configuration.

DETAILED DESCRIPTION OF THE EMBODIMENTS

Figure 1:
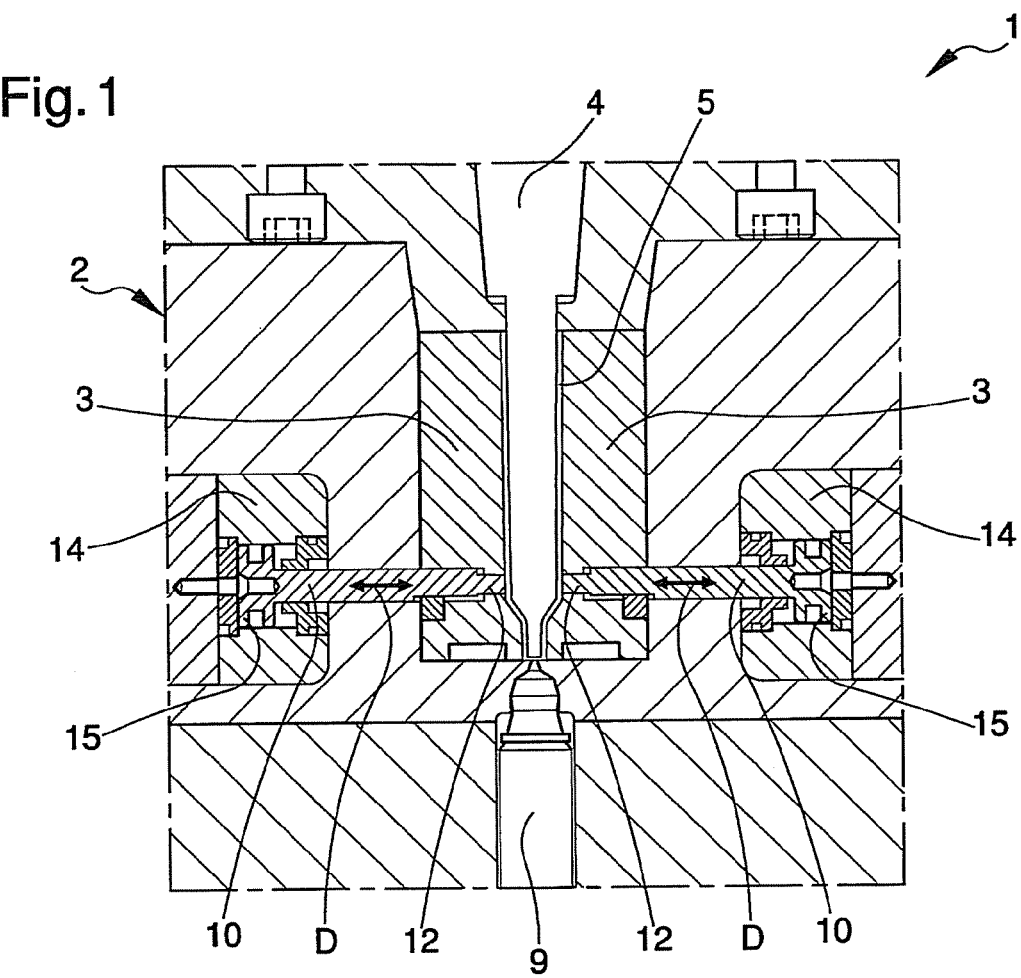
FIG. 1 is a section view of an apparatus according to the invention.
Figure 2:
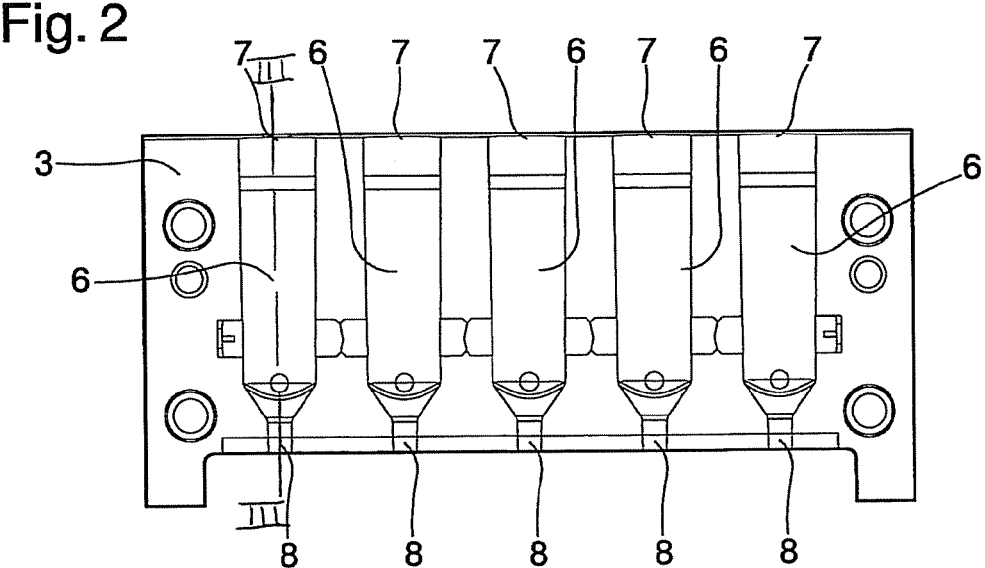
FIG. 2 is a plan view of the female matrix die according to the invention.
Figure 3:
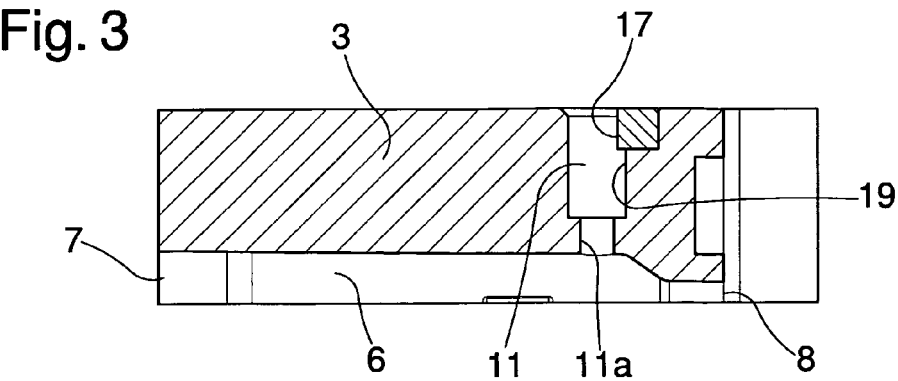
FIG. 3 is a section view along the plane of FIG. 2.
Figure 4:
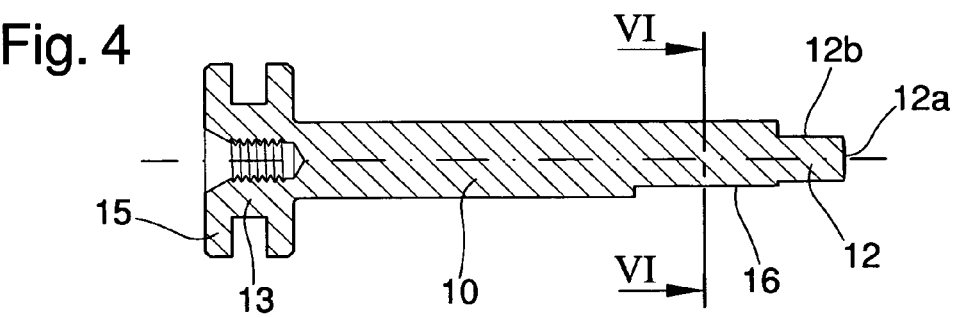
FIG. 4 is a longitudinal section view of the centring stem according to the invention.
Figure 5:
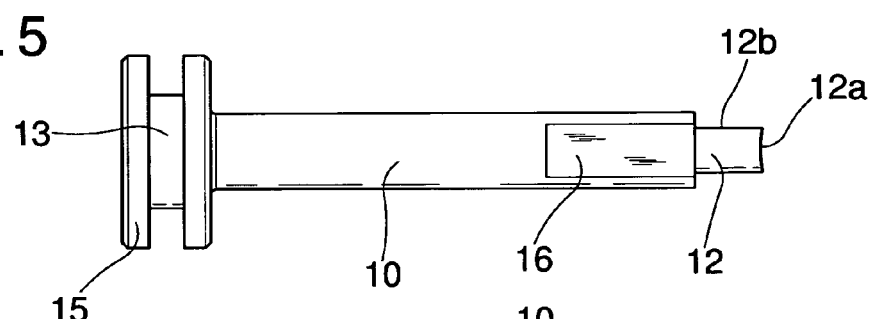
FIG. 5 is a side view of the centring stem according to the invention.
Figure 6:
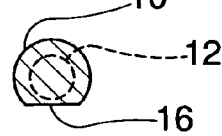
FIG. 6 is a section view along the VI-VI plane of FIG. 4.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

With reference to such figures, globally indicated by 1 is an apparatus for the injection moulding of containers in plastic material, which can be both of the thermoplastic, thermosetting and other type again.

The apparatus 1 shown in the illustrations, e.g., is intended for the moulding of strips of single-dose bottles for pharmaceutical, medicinal and cosmetic products or the like, but different embodiments cannot be ruled out.

The apparatus 1 comprises a mould 2 which has a female matrix die 3 and at least a corresponding male element 4 that can be coupled together, between the female matrix die 3 and the male element 4, a forming inter-space 5 being defined for molding the containers.

The shape and thickness of the forming inter-space 5 substantially corresponds to the shape and thickness of the walls of the containers to be moulded.

The female matrix die 3, in particular, is defined by two opposite half-shells, on each of which is obtained a plurality of cavities 6 equal to the number of containers produced in each moulding cycle and which are complementary the one to the other so that, by fastening together the two half-shells 3, the cavities 6 define the impression that gives shape to the outer surface of the containers to be obtained.

Usefully, in each cavity 6 can be fitted a corresponding male element 4 the outer surface of which defines the inner surface of the container walls.

Clearly, between each cavity and the corresponding male element 4 a corresponding forming inter-space 5 is delimited for a total number of forming inter-spaces 5 equal to the number of containers to be produced in each moulding cycle; alternative embodiments cannot however be ruled out in which, instead, only one cavity 6, only one male element 4 and only one forming inter-space 5 are provided.

Each cavity 6 has, at one extremity, an opening 7 for the entry of the corresponding male element 4 and, at the opposite extremity, a mouth 8 for the introduction of plastic material P to be moulded, which can be connected to a supply circuit 9 of the plastic material P under pressure, of the type e.g. comprising an injector unit suitable for heating the plastic material P to bring it to the plastic state and convey it in the cavities 6.

The apparatus 1 has automatic centring means 10 of the male elements 4 with respect to the female matrix die 3 which are associated with the mould 2 and have alternate operation with respect to the injection of the plastic material P into the forming inter-spaces 5.

In the particular embodiment of the invention shown in the illustrations, the automatic centring means 10 are composed of two centring stems for each male element 4, which are arranged with their longitudinal axes at right angles with respect to the longitudinal dimension of the male elements 4 and are axially sliding with reciprocal motion along a sliding direction D substantially transversal with respect to the male elements 4 inside the corresponding centring holes 11 obtained in the female matrix die 3.

For each male element 4, the centring stems 10 are arranged diametrically opposite with respect to the forming inter-space 5, i.e., they are opposite at 180°; alternative embodiments cannot however be ruled out in which, for each male element 4 three centring stems 10 are provided, e.g., displaced by 120°, or four centring stems 10, e.g., displaced by 90°, or other combinations still.

The centring stems 10 comprise a first extremity 12, turned towards the corresponding male element 4, and a second extremity 13, opposite the first.

The first extremity 12 has a locator surface 12a for the male elements 4, shaped substantially complementary to the shape of the male elements 4 in the proximity of the centring holes 11; taking into account that the male elements 4 have a substantially cylindrical and/or truncated cone shape, the locator surfaces 12a are at least in part concave.

Inside the corresponding centring hole 11, each centring stem 10 is moving with reciprocating motion between a backward configuration, wherein the locator surface 12a is arranged substantially in correspondence to the inner surface of the female matrix die 3, and a forward configuration wherein the locator surface 12a is up against the corresponding male element 4: in point of fact, the work stroke of the centring stems 10, i.e., that completed to move from backward to forward configuration, is substantially equal to the thickness of the forming inter-spaces 5 in the proximity of the centring hole 11.

To operate each centring stem 10 between the backward configuration and the forward configuration, control means 14, 15 are provided comprising a cylinder 14 with fluid-dynamic operation (hydraulic or pneumatic) associated with the mould 2, wherein slides a piston 15 associated with the second extremity 13 of the centring stem 10; alternatively, the control means 14, 15 can be of the electric type.

The centring stems 10 have a substantially axial-symmetric shape but have a prismatic portion 16 suitable for prismatically coupling with a corresponding seat 17 of the centring holes 11 and which, in point of fact, acts as an anti-rotation system and allows the centring stems 10 to slide in the centring holes 11 without turning around their own axes.

Advantageously, the first extremity 12 of the centring stems 10 has a cross section substantially decreasing towards the corresponding locator surface 12a, i.e., the closer one comes to the locator surface 12a, the more the section of the centring stems 10 is reduced.

More in detail, the first extremity 12 of the centring stems 10 has a side surface 12b which, with respect to the sliding direction D, is sloped by an angle substantially between 0.05° and 2° and which is preferably equal to 0.5°.

Figure 7:
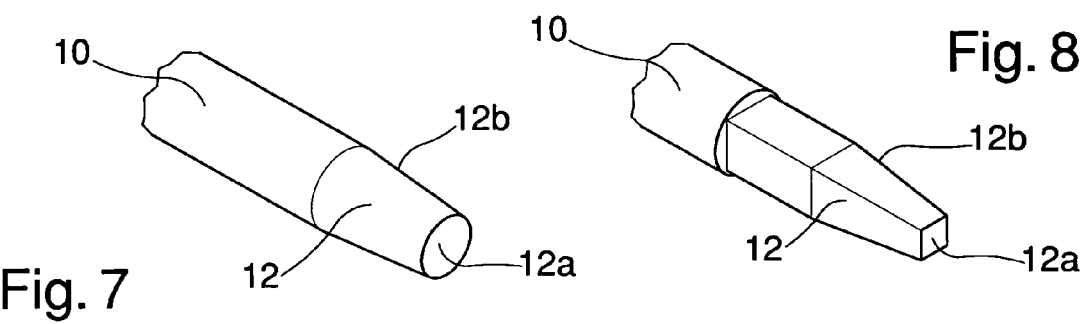
FIG. 7 is a perspective, schematic and partial view of the centring stem according to the invention.
Figure 8:
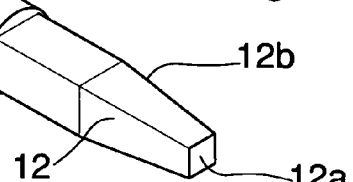
FIG. 8 is a perspective, schematic and partial view of an alternative embodiment of the centring stem according to the invention.

In point of fact, the first extremity 12 has a truncated-cone shape (FIG. 7), with taper between 0.1° and 1° and preferably equal to 0.5°; that the first extremity 12 have a truncated pyramid shape (FIG. 8), or still differently, have the same inclination as the side surface 12b cannot however be ruled out.

For reasons of clarity of representation, in the figures from 7 to 10, the inclination of the side surface 12b of the centring stems 10 is considerably accentuated with respect to the real dimensions.

In correspondence to the cavity 6, the centring holes 11 comprise an end section 11a shaped at least partially complementary to the first extremity 12 of the centring stems 10.

In forward configuration, therefore, the side surface 12b of the first extremities 12 is perfectly stopped up against the end section 11a of the centring holes 11 (FIG. 9).

In backward configuration, instead, the side surface 12b does not contact the end section 11a and, due to the tapered shape of the centring stems 10, between them a slit 18 forms that emerges in correspondence to the cavity 6 between the locator surface 12a of the centring stems 10 and the inner surface of the female matrix die 3 (FIG. 10).

It is however emphasised that in this configuration, the locator surface 12a and the inner surface of the female matrix die 3 are less than 50 μm the one from the other, e.g., for a distance of about 5 μm, which is a distance small enough to prevent the passage of the plastic material P.

The plastic material P in fluid state which is injected into the mould 2, in fact, is able to flow inside the inter-spaces and slots which have not too small thicknesses because otherwise by effect of capillarity, its transit is obstructed despite the considerable injection pressures.

By virtue of the inclination of the side surface 12b, in the movement between the backward configuration and the forward configuration the first extremity 12 of the centring stems 10 does not slide against the end section 11a of the centring holes 11 and, consequently, it does not produce wear phenomena that could cause the formation of scrap in the proximity of the forming inter-spaces 5.

The part of the centring stems 10 in the immediate proximity of the first extremity 12, on the other hand, slides at least in part on the surfaces of the centring holes 11 which, however, are shaped to define at least a free space 19 for collecting any scrap without this having the chance to reach the cavities 6 and negatively affect moulding.

Nevertheless, to further reduce wear and the corresponding risk of the formation of scrap, the centring stems 10 and the centring holes 11 are at least partially covered with an anti-friction covering made of a material selected from the list comprising: Titanium Nitride, Chromium Nitride, Niobium Nitride, Titanium and Aluminium Nitrides, Tungsten Carbide (e.g., the materials/treatments known as a "CarbonLafer", "Tinalox", "Tinalox Plus" and "Superlattice").

The operation of the present invention is the following.

After closing the female matrix die 3, bringing together the half-shells 3 and fastening them together, the male elements 4 are inserted in the cavities 6 with which they couple to define the forming inter-spaces 5.

At this point, the control means 14, 15 operate the centring stems 10 moving them from the backward configuration to the forward configuration.

In this configuration, the side surfaces 12b of the first extremities 12 come into contact with the end sections 11a of the centring holes 11 without any type of sliding.

The first extremities 12 of the centring stems 10 enter the forming inter-spaces 5 until they contact the male elements 4, centring on these and fastening them with respect to the female matrix die 3.

The plastic material P to be moulded is then conveyed from the supply circuit 9 inside the forming inter-space 5.

Before a quantity of plastic material P is injected equal to the total quantity required for forming the containers, the control means 14, 15 operate the centring stems 10 causing them to return to the backward configuration.

The injection of the residual fraction of plastic material P allows completing the forming of the container walls, which is followed by a stop during which the introduced plastic material P consolidates in the required shape and the containers thus formed can be taken out of the mould 2.

It has in point of fact been ascertained how the described invention reaches the proposed objects.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. Apparatus (1) for the injection moulding of containers in plastic material, comprising:
   at least a mould (2) having at least a female matrix die (3) and at least a corresponding male element (4) that can be coupled to one another to define a forming inter-space (5) of at least a container, and
   at least one centring stem (10) for centring said male element (4) with respect to said female matrix die (3), wherein:
      said at least one centering stem comprises a first extremity (12) having at least a locator surface (12a) for said male element (4) and a side surface (12b),
      said surfaces sliding in a direction (D) transversal with respect to said male element (4) inside a corresponding centring hole (11) obtained in said female matrix die (3), and
      said surfaces moving with a reciprocating motion between a backward configuration, in which said locator surface (12a) is arranged in correspondence to the inner surface of said female matrix die (3), and a forward configuration, in which said locator surface (12a) abuts said male, element (4), wherein:
said first extremity (12) of the centring stem (10) has a cross section decreasing towards said locator surface (12a) which decreases continuously towards said locator surface (12a), and
said side surface (12b) is sloped by an angle between 0.05° and 2° with respect to said sliding direction (D).

2. Apparatus (1) according to the claim 1, wherein said side surface (12b) is sloped by an angle equal to 0.5° with respect to said sliding direction (D).

3. Apparatus (1) according to claim 1, wherein said first extremity (12) has a truncated cone shape.

4. Apparatus (1) according to claim 1, wherein said first extremity (12) has a truncated pyramid shape.

5. Apparatus (1) according to claim 1, wherein said centring hole (11) comprises at least an end section (11a) at least partially complementary to said first extremity (12) of the centring stem (10).

6. Apparatus (1) according to claim 1, wherein a work stroke of said centring stem (10) between said backward configuration and said forward configuration is equal to the thickness of said forming inter-space (5) in the proximity of said centring hole (11).

7. Apparatus (1) according to claim 1, wherein said locator surface (12a) is complementary to the shape of said male element (4) close to said centring hole (11).

8. Apparatus (1) according to claim 1, wherein in said backward configuration said locator surface (12a) of the centring stem (10) and said inner surface of the female matrix die (3) are less than 50 μm apart.

9. Apparatus (1) according to claim 1, further comprising control means (14, 15) for the centring stem (10) for moving said stem between said backward configuration and said forward configuration.

10. Apparatus (1) according to claim 9, wherein said control means (14, 15) comprise at least a cylinder (14) with fluid-dynamic operation in which a piston (15) slides associated with a second extremity (13) of the centring stem (10), opposite said first extremity (12).

11. Apparatus (1) according to claim 1, wherein said centring stem (10) comprises at least a prismatic portion (16) suitable for prismatically coupling with a corresponding seat (17) of said centring hole (11).

12. Apparatus (1) according to claim 1, wherein said centring stem (10) and/or said centring hole (11) is at least partially covered with an anti-friction covering.

13. Apparatus (1) according to claim 12, wherein said anti-friction covering is made of a material chosen from the list comprising: Titanium Nitride, Chromium Nitride, Niobium Nitride, Titanium and Aluminium Nitrides, Tungsten Carbide.

14. Apparatus (1) according to claim 1, wherein said centring stems (10) are two in number and are arranged diametrically opposite with respect to said forming inter-space (5).

* * * * *